United States Patent
Yang et al.

(10) Patent No.: US 7,342,065 B2
(45) Date of Patent: Mar. 11, 2008

(54) PREPARATION OF NANOCOMPOSITE OF ELASTOMER AND EXFOLIATED CLAY PLATELETS, RUBBER COMPOSITIONS COMPRISED OF SAID NANOCOMPOSITE AND ARTICLES OF MANUFACTURE, INCLUDING TIRES

(75) Inventors: Xiaoping Yang, Streetsboro, OH (US); Martin Paul Cohen, Fairlawn, OH (US); Michael Leslie Senyek, Tallmadge, OH (US); Dane Kenton Parker, Massillon, OH (US); Steven Wayne Cronin, Akron, OH (US); Lewis Timothy Lukich, Akron, OH (US); William Paul Francik, Bath, OH (US); Cigdem Gurer, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 500 days.

(21) Appl. No.: 10/932,534

(22) Filed: Sep. 2, 2004

(65) Prior Publication Data

US 2005/0065266 A1    Mar. 24, 2005

Related U.S. Application Data

(60) Provisional application No. 60/504,424, filed on Sep. 18, 2003.

(51) Int. Cl.
*C08K 3/34*    (2006.01)
(52) U.S. Cl. ....................... 524/445; 524/492; 524/493; 524/495

(58) Field of Classification Search ................ 524/445, 524/447; 525/296
See application file for complete search history.

(56) References Cited

U.S. PATENT DOCUMENTS

| | | | | |
|---|---|---|---|---|
| 5,552,469 | A | 9/1996 | Beall et al. ................... | 524/445 |
| 5,886,105 | A * | 3/1999 | Mc Kee et al. .............. | 525/296 |
| 5,936,023 | A | 8/1999 | Kato et al. ................... | 524/445 |
| 6,034,164 | A | 3/2000 | Elspass et al. .............. | 524/445 |
| 6,818,693 | B2 * | 11/2004 | Heinrich et al. ............. | 524/445 |
| 6,861,462 | B2 * | 3/2005 | Parker et al. ................ | 524/445 |
| 2001/0025076 | A1 * | 9/2001 | Lan et al. .................... | 524/445 |
| 2002/0165305 | A1 * | 11/2002 | Knudson et al. ............ | 524/445 |

FOREIGN PATENT DOCUMENTS

| | | |
|---|---|---|
| EP | 178079 | 4/1986 |
| EP | 678549 | 10/1995 |
| WO | WO 97/00910 A1 * | 9/1997 |

OTHER PUBLICATIONS

European Search Report.

* cited by examiner

*Primary Examiner*—Katarzyna Wyrozebski
(74) *Attorney, Agent, or Firm*—Henry C. Young, Jr.

(57) ABSTRACT

This invention relates to preparation of nanocomposites comprised of elastomer and a dispersion of an at least partially exfoliated water swellable clay and to rubber compositions containing such nanocomposite and articles of manufacture which contain at least one component thereof. The nanocomposite is prepared by addition of a water suspension of water swellable clay particles to an anionic aqueous emulsion of elastomer particles to form a mixture to which an amine having at least two amine centers is added to intercalate and at least partially exfoliate the water swelled clay particles by an ion exchange within the galleries of the multilayered clay with cation exchangeable ion(s) and to aid in coagulating the elastomer and resultant clay particles to form said nanocomposite.

15 Claims, No Drawings

PREPARATION OF NANOCOMPOSITE OF ELASTOMER AND EXFOLIATED CLAY PLATELETS, RUBBER COMPOSITIONS COMPRISED OF SAID NANOCOMPOSITE AND ARTICLES OF MANUFACTURE, INCLUDING TIRES

The Applicants hereby incorporate by reference prior U.S. Provisional Application Ser. No. 60/504,424, filed on Sep. 18, 2003.

FIELD OF THE INVENTION

This invention relates to preparation of nanocomposites comprised of elastomer and a dispersion therein of an at least partially exfoliated, intercalated, multilayered, water swellable clay (e.g. smectite clay). The invention further relates to rubber compositions comprised of such nanocomposite, articles of manufacture, such as for example tires and industrial products such as, for example conveyor belts, power transmission belts and hoses, which contain at least one component comprised of said nanocomposite or said rubber composition. A particular adaptation for such rubber composition is contemplated for rubber tire components, such as for example treads, where significant replacement of carbon black reinforcement may be desired to reduce heat buildup for tire durability and reduction in tire weight for vehicular fuel economy such as, for example, aircraft tire treads. The nanocomposite is prepared by addition of a water suspension of water swellable clay particles to an aqueous emulsion of anionic (negatively charged) elastomer particles to form a mixture thereof to which an amine having at least two amine centers in a form of a cationic (positively charged) polymeric quaternary amine or ethylene polyamine is subsequently added to both intercalate and at least partially exfoliate the water swelled clay particles by an ion exchange within the galleries of the multilayered clay with cation exchangeable ion(s) and to aid in promoting the elastomer and resultant clay particles to coagulate and form a nanocomposite thereof. The coagulation may be aided by addition of an acid or salt/acid to reduce the pH and thereby destabilize the aqueous emulsion. The aqueous emulsion may be of, for example, synthetic anionic styrene/butadiene copolymer particles, or natural anionic cis 1,4-polyisoprene rubber particles (e.g. natural rubber latex).

BACKGROUND OF THE INVENTION

Various rubber compositions have been heretofore been prepared as masterbatches, or pre-formed rubber compositions, to prepare subsequent rubber compositions, and articles of manufacture, including tires, which have at least one component of a rubber composition comprised of such masterbatch-derived subsequent rubber composition.

For example, nanocomposites have been prepared which are composed of an elastomer which contains a dispersion of particles of intercalated clay which is at least partially exfoliated into individual platelets.

While relatively bulky, substantially hydrophilic, clay itself is normally viewed as a rubber diluent rather than reinforcement, clay particles in a form of more hydrophobic, very small, clay platelets may be considerably more efficient for the reinforcement of rubber compositions.

Indeed, it is to be appreciated that good dispersions of clay particles are somewhat difficult to obtain by simply mixing the clay with diene-based rubber compositions because the clay particles, in general, are primarily hydrophilic in nature and therefore are less compatible with, and tend to repelled by, diene-based elastomers. Should very small exfoliated clay platelets derived from water-swellable clay particles be desired for use as reinforcement in an elastomer composition, then it is considered herein that the better the dispersion of the particles within the elastomer the better the reinforcing effect. Accordingly, it is considered herein that a better dispersion is accomplished by blending exfoliated clay particles with one or more elastomers in a form of a nanocomposite thereof in which the very small exfoliated clay platelets have been rendered more hydrophobic in nature and therefore more compatible with diene-based elastomers by the intercalation and exfoliation thereof in situ within an anionic emulsion of elastomer particles by use of an amine having at least two amine centers as a cationic polymeric quaternary amine or ethylene polyamine via an ion exchange with cation exchangeable ion(s) contained within the galleries of the layers of the water-swellable clay within the anionic emulsion of elastomer particles instead of simply dry-mixing the clay with an elastomer composition.

In one aspect of this invention, a masterbatch-derived rubber composition is provided as such a nanocomposite, where the nanocomposite may be referred to herein as a masterbatch, and where the masterbatch nanocomposite, with its dispersed partially exfoliated, intercalated clay particle content, is blended with at least one additional elastomer to form the resultant rubber composition.

In another aspect of this invention, an article of manufacture is provided, such as for example tires and industrial product such as, for example, conveyor belts, power transmission belts and hoses, which has at least one component of a rubber composition comprised of the nanocomposite or comprised of said rubber composition which contains such nanocomposite (or masterbatch if the nanocomposite is referred to as a masterbatch).

It is considered herein that such rubber composition containing such nanocomposite, when used to replace a portion of the normally used carbon black reinforcement, may be particularly adaptable for use as a component for a tire, particularly a tire tread such as an aircraft tire tread. Reduced hysteresis (e.g. an increase in 100° C. rebound value or a reduction in tangent delta value) is desired to promote a reduction in heat buildup of the tire, and therefore an increase in tire durability. This compositional characteristic is especially important due to relatively high speeds and loads aircraft tires experience during take-offs and landings. The weight reductions possible by replacing a portion of the carbon black reinforcement of the rubber composition can promote an increase in the aircraft vehicular fuel economy both on the ground and in the air. The reduction in component weight combined with the aforesaid promoted tire durability also allows the tire manufacturer greater flexibility in tire design to make the overall tire more durable, especially in applications where tire weight is severely limited by the airframe manufacturer's design of the aircraft itself.

Nanocomposites composed of elastomers and a dispersion of particles of intercalated, and possibly partially exfoliated, water-swellable clay have heretofore been prepared by various methods.

For example, such nanocomposites have been prepared by first pre-intercalating a multi-layered, hydrophilic water-swellable clay in water which contains an intercalating compound (e.g. a quaternary ammonium salt) to intercalate the clay by causing an ion exchange to occur in which the quaternary ammonium salt displaces one or more cations contained within the galleries of the multi-layered clay. The resultant intercalated clay particles are dried and then mixed with an elastomer to form a dispersion thereof within the elastomer. To a small extent, the layers of the intercalated clay may become delaminated, or exfoliated, into individual platelets, which may include delaminated, or exfoliated, stacks of platelets, either during the intercalation process or upon subsequent high shear mixing with the elastomer.

Such a method is considered herein to be excessively dependent upon high shear mixing of the intercalated clay into the elastomer composition and relatively inefficient insofar as obtaining a good overall dispersion of substantially exfoliated platelets of an intercalated water-swellable clay within an elastomer matrix and therefore not likely to be relatively cost efficient method of nanocomposite preparation.

Other suggested methods of nanocomposite preparation include, for example, utilizing an ion exchange phenomenon between cation exchangeable ions contained within the galleries of stacked platelets of a water-swellable clay composed of multiple layers of negatively charged stacked platelets and cationically (negatively) charged elastomer particles contained in an aqueous latex thereof. By such method the exfoliated platelets are thereby contemplated as being created in situ within the latex.

In practice, a maximized state of exfoliation of the clay into individual platelets is considered herein to be desirable in order to enhance reinforcement of elastomer-based components of articles of manufacture, particularly tires and more particularly tire treads.

It is therefore desired herein to provide a significantly exfoliated, intercalated, water-swellable clay in or from a relatively low shear medium, for example a latex, prior to dry blending under high shear conditions with an elastomer composition.

Accordingly, for this invention, a process of creating a dispersion of exfoliated clay platelets in an elastomer is provided which is considered herein to be a significant departure from past practice.

In practice, for this invention, a dispersion of at least partially exfoliated, intercalated, water swellable clay particles in an elastomer is provided by blending a water slurry of water-swellable multilayered clay (e.g. a smectite clay) with an emulsion (latex) of anionic (negatively charged) elastomer particles having a pH in a range of about 6 to about 10 and blending therewith an amine having at least two amine centers as a cationic (positively charged) polymeric quaternary amine or ethylene polyamine to effect an ion exchange with cation exchangeable ion(s) contained within the galleries of the stacked platelets of the clay and thereby intercalate the clay and cause at least a partial exfoliation of the clay into individual clay platelets, all in situ. In practice, a small amount of acid, or salt/acid combination, is added to reduce the pH of the emulsion to a value, for example, in a range of from about 3 to about 4, to aid in coagulating (precipitating) the elastomer particles and partially exfoliated, intercalated, clay as a nanocomposite.

The nanocomposite may then simply be recovered by drying the coagulant, or precipitate.

In practice, the anionic (negatively charged) elastomer particles of synthetic elastomers may be formed, for example, by use of anionic surfactant(s) to stabilize the emulsion. Such use of anionic surfactants for such purpose is well known to those having skill in such art.

In practice, an acid, or salt/acid combination, often is used to reduce the pH of an anionic latex from a pH, for example, in a range of about 6 to about 10 to a more acidic value in a range of, for example, of about 3 to about 4 to therefore promote a destabilization of the emulsion and promoting a coagulation, or precipitation, of the elastomer particles from the emulsion. A representative example of an acid, or salt/acid combination, for such purpose is, for example, sulfuric acid or a combination of sodium chloride and sulfuric acid. Such use of an acid, or salt/acid combination is well known to those having skill in such art.

In practice, a coagulation promoting agent for the elastomeric particles in an anionic emulsion may be, for example, a cationic liquid polymeric quaternary amine. A representative example of material containing a cationic polymeric quaternary amine sometimes used for such purpose is, for example, Perchem 503™ from the Petrolite Company. A representative example of an ethylene polyamine as a mixture of ethylene polyamines for such purpose is, for example, PM-1969™ from the Union Carbide Company.

However, the presence of such cationic polymeric quaternary amine in the residual, recovered elastomer may also serve as a sulfur vulcanization accelerator in a sulfur vulcanizable rubber composition which contains the recovered elastomer.

Accordingly, excessive use of such cationic polymeric quaternary amine for coagulation of the anionic elastomer particles from the latex is considered herein to be undesirable because its content within a sulfur curable diene-based elastomer (e.g. styrene/butadiene copolymer elastomer) is considered herein to unsatisfactorily accelerate the sulfur curing, or vulcanization, of diene-based elastomers.

For this invention, however, it is considered herein that a resultant synergistic combination of the water-swelled clay and cationic (positively charged) polymeric quaternary amine inclusion in an aqueous emulsion of anionic (negatively charged) elastomer particles results.

While one aspect of the mechanism might not be fully understood, it appears that a more acceptable content, or effective content, of the resultant polymeric quaternary amine is contained in the recovered nanocomposite in that it apparently has less sulfur vulcanization acceleration effect in a sulfur-containing rubber composition which contains the nanocomposite perhaps because of a reduction in the amount of the polymeric quaternary amine needed to effect the aforesaid elastomer particle coagulation or perhaps the polymeric quaternary amine is combined with the aforesaid intercalated clay in a manner that its sulfur vulcanization acceleration is attenuated.

In this manner, then, it is considered herein that both a more efficient use of a cationic polymeric quaternary amine coagulant for the elastomer from the emulsion is enabled and, also a more efficient in situ formation of a reinforcing material in the resultant elastomer is enabled in a form of an at least partially exfoliated, intercalated clay.

Further, the aforesaid use of an acid, or salt/acid combination, can be beneficially used to aid in the coagulation process by reduction of the pH of the emulsion/clay mixture in combination with, or together with, the addition of amine having at least two amine centers as the cationic polymeric quaternary amine or ethylene polyamine for coagulation, or precipitation, of the elastomer and clay particles from the anionic emulsion mixture. Thus, in one aspect, the addition of the acid, or salt/acid combination, may, in one respect, be considered a part of the synergistic procedure.

Accordingly, this invention is considered herein to be a significant departure from past practice by a synergistic blending of a minor amount of an amine having at least two amine centers as a cationic polymeric quaternary amine or ethylene polyamine with an aqueous mixture of anionic elastomer particles and water swelled, water-swellable clay, together with an acid, or salt acid combination, to effect both a coagulation/precipitation of the elastomer/clay particle composite and an in situ formation of reinforcement for the elastomer of partially exfoliated, intercalated clay particles.

Therefore, a significant aspect of this invention is the intercalation of the water-swelled clay contained in an anionic emulsion of elastomer particles, wherein the water-swelled clay contains cation exchangeable ions (e.g. sodium ion) within the galleries between its platelets and wherein the intercalation is accomplished by addition of an amine having at least two amine centers as a cationic polymeric quaternary amine or ethylene polyamine to effect an ion transfer between the ions within the clay galleries and the cationic quaternary amine or ethylene polyamine.

A further significant aspect of the invention is the substantially simultaneous precipitation (coagulation) of the elastomer with contained dispersion of the intercalated (and partially exfoliated) clay particles as a nanocomposite which is aided by the addition of the acidic water to destabilize the emulsion.

Thus, the practice of this invention excludes a sole use of an acid, or salt/acid combination, to destabilize the anionic emulsion and coagulate/precipitate the elastomer/clay composite from the emulsion mixture.

In an additional departure from past practice, the water-swellable clay is introduced into the emulsion of anionic elastomer particles in a pre-water swelled from but without being first intercalated with an intercalant (e.g. a non-pre-intercalated clay as being a water-swelled clay which is not first intercalated with a quaternary ammonium salt to effect an ion exchange prior to its addition to the emulsion) so that the addition of the cationic polymeric quaternary amine or ethylene polyamine to the emulsion/clay mixture is relied upon to intercalate the water-swelled clay by the aforesaid ion exchange in situ within the emulsion of anionic elastomer particles.

For the practice of this invention, it is intended that the clay intercalation and exfoliation process for this invention is conducted in the presence of the anionic (negatively charged) elastomer particles to an exclusion of a thermoplastic polymer latex and to the exclusion of cationic (positively charged) elastomer particles, particularly cationic elastomer articles contained in a cationic surfactant.

In a summary, then, the process of this invention differs significantly from past practice, at least in part because the water-swellable clay (e.g. smectite clay) is (A) not intercalated during the polymerization of the monomers, (B) not intercalated by physically blending the smectite clay with the elastomer after it has been coagulated and recovered as a dry elastomer and (C) not intercalated by blending a smectite clay which has been pre-intercalated by treatment with a quaternary ammonium salt prior to blending the pre-intercalated clay with the elastomer.

Thus, it is readily seen, and it is considered herein, that the process of this invention differs significantly from a relatively simple past practice of coagulating a latex emulsion with a polymeric quaternary amine.

Indeed, while some elements of the process of this invention might appear to be somewhat simplistic in operational nature, it is considered herein that the overall technical procedural application is a significant departure from past practice.

Water-swellable clays considered for use in this invention which are clays composed of a plurality of stacked platelets (e.g. very thin silicate based platelets) which contain cationically exchangeable ions in the galleries between such platelets. Representative of such clays are water swellable smectite clays, vermiculite based clays and mica based clays. Preferably such water-swellable clays are smectite clays. Representative of smectite clays are, for example, montmorillonite, hectorite, nontrite, beidellite, volkonskoite, saponite, sauconite, sobockite, sterensite, and sinfordite clays of which montmorillonite and hectorite clays are preferred. For various exemplary smectite clays, see for example U.S. Pat. No. 5,552,469. Such cationically exchangeable ions contained in such galleries are typically comprised of at least one of sodium ions and potassium ions, which may also include calcium ions and/or magnesium ions, although it is understood that additional cationically exchangeable ions may be present. Typically, montmorillonite clay is preferred which contains sodium ions in such galleries, although it is understood that a minor amount of additional cationically exchangeable ions may be contained in such galleries such as for example, calcium ions.

In practice, the degree of exfoliation of the intercalated clay platelets can be qualitatively evaluated, for example, by wide angle X-ray diffraction (WAXD) as evidenced by a substantial absence of an X-ray peak which is a well known method of such evaluation. Such evaluation relies upon observing WAXD peak intensities and changes (increase) in the basal plane spacing between platelets.

It is to be appreciated that, in practice, a synthetic emulsion of anionic elastomer particles may be prepared, for example, by emulsion polymerization of monomers selected from, for example, styrene and 1,3-butadiene or 1,3-butadiene, or 1,3-butadiene and acrylonitrile, or styrene and isoprene, or isoprene, and particularly the styrene and 1,3-butadiene monomers, in a water emulsion medium via a free radical polymerization initiators in the presence of an anionic surfactant. Preferably the monomers are a combination of styrene and 1,3-butadiene to form anionic styrene/butadiene copolymer elastomer particles in the emulsion.

It is also to be appreciated that the emulsion, or latex, of anionic elastomer particles may be natural cis 1,4-polyisoprene contained in a natural rubber latex.

Representative examples of anionic surfactants for the preparation of the synthetic emulsion of anionic elastomer particles may be found, for example, in *McCutcheon's*, Volume 1, "Emulsifiers & Detergents", North American Edition, 2001, Pages 291 and 292, with representative examples of non-ionic surfactants shown on Pages 294 through 300 and examples of cationic surfactants shown on Pages 300 and 301.

For the practice of this invention, cationic surfactants for the preparation of the synthetic elastomer particles are to be excluded.

In one aspect, a water swellable clay, such as for example a smectite clay such as, for example, a montmorillonite clay, for use in this invention, might be described, for example, as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring montmorillonite clay, some of the aluminum cations ($Al^{+3}$) are viewed as having been replaced by magnesium cations ($Mg^{+2}$) which results in a net negative charge to the platelet layers of the clay structure. Such negative charge is viewed as being balanced in the naturally occurring clay with hydrated sodium, lithium, magnesium, calcium and/or potassium cations, usually primarily sodium ions, within the spacing (sometimes referred to as "galleries") between the aforesaid aluminosilicate layers, or platelets.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a process of preparing a nanocomposite comprised of an elastomer and at least partially exfoliated, intercalated water-swellable clay, (in situ within an elastomer host of anionic elastomer particles), comprises (A) forming a first blend of water-swelled clay and anionic polymer particle emulsion by blending:

(1) an aqueous mixture comprised of water and a multilayered water-swellable clay, exclusive of an intercalant for said clay (e.g. exclusive of a quaternary ammonium salt), wherein said water-swellable clay is comprised of a plurality of stacked platelets with water-expanded (swollen) galleries between said platelets, wherein said galleries contain naturally occurring cationic ion exchangeable ions therein, (e.g. montmorillonite clay which contains sodium ions within said galleries), and (2) an emulsion of anionic synthetic elastomer particles as an aqueous pre-formed elastomer emulsion having a pH in a range of from about 6 to about 11 and exclusive of a thermoplastic polymer latex, comprised of anionic elastomer particles (elastomer particles having anions on the surface derived from an anionic surfactant) prepared by aqueous free radical induced polymerization of monomers in the presence of a free radical generating polymerization initiator and non-polymerizable anionic surfactant, wherein said synthetic elastomer particles are derived from an aqueous polymerization of monomers comprised of at least one of isoprene and 1,3-butadiene monomers or styrene and at least one of isoprene and 1,3-butadiene monomers or acrylonitrile and at least one of isoprene and 1,3-butadiene monomers, preferably monomers consisting of styrene and 1,3-butadiene, or (3) an emulsion of anionic natural cis 1,4-polyisoprene elastomer particles, and (B) blending with said first blend (1) an aqueous mixture comprised of water and amine having at least two amine centers selected from a cationic polymeric quaternary amine or ethylene polyamine, and (2) an aqueous mixture comprised of water and inorganic acid having a pH in a range of about 3 to about 4;

In further accordance with this invention, said monomers for said synthetic elastomer particles are derived from aqueous emulsion polymerization of:

(A) styrene and 1,3-butadiene monomers comprised of from about 0.1 to about 40, alternately about 15 to about 35, weight percent styrene monomer, (B) styrene and isoprene monomers which comprised of from about 0.1 to about 40, alternately about 15 to about 35, weight percent styrene monomer, (C) isoprene monomer, (D) 1,3-butadiene monomer, (E) isoprene and 1,3-butadiene monomers, (F) 1,3-butadiene and acrylonitrile monomers comprised of about 5 to about 45 weight percent acrylonitrile monomer, or (G) isoprene and acrylonitrile monomers comprised of about 5 to about 45 weight percent acrylonitrile monomer.

In practice, preferably from about 0.5 to about 80, alternately about 5 to about 45, parts by weight of said water swelled clay is added to said anionic emulsion per 100 parts by weight of said elastomer particles, depending somewhat upon the nature of the clay including the cation exchangeable ions within the galleries between the layers of the clay, elastomer itself and the amine having at least two amine centers selected from a cationic polymeric quaternary amine or ethylene polyamine.

Accordingly, the resulting nanocomposite may contain about 0.5 to about 80, alternately about 5 to about 45, parts by weight of at least partially exfoliated, intercalated multilayered water swellable clay particles per 100 parts by weight of the elastomer host.

In practice, the said cationic polymeric quaternary amine may be a cationic polyelectrolyte of which various cationic polyelectrolytes are described in *Polymeric Materials Encyclopedia*, Volume 8, (1996), published by CRC Press, Inc., which Pages 5837 through 5849 are incorporated herein by reference in their entirety.

In practice, the said ethylene polyamine (e.g. said PM-1969) may be, or may be contained in, a mixture of ethylene polyamines as, for example, a mixture comprised of, for example, ethylene polyamines in general with at least two amine centers, pentaethylenehexamine mixture, diethylenetriamine, tetraethylenepentamine mixture, triethylenetetramine mixture, aminoethylethanolamine, aminoethylpiperazine. Such mixture which contains, or is comprised of, at least one ethylene polyamine having at least two amine centers is more simply referred to herein as an ethylene polyamine having at least two amine centers.

As hereinbefore described, in practice, the emulsion of anionic elastomer particles may be prepared, for example, by a free radical polymerization of the monomers in a water-based medium in the presence of a free radical initiator and said anionic surfactant(s). A general description of an aqueous emulsion polymerization of styrene and 1,3-butadiene directed to an anionic surfactant (emulsifier) based polymerization, may be found, for example, in *The Vanderbilt Rubber Handbook*, 1978 Edition, Pages 55 through 61. A general description of the micelle-generating substances (emulsifiers, surfactants, soaps) is given in *Emulsion Polymerization Theory and Practice* by D. C. Blackley, 1975, Pages 251 through 328.

The use of various free radical generating initiators for aqueous emulsion of styrene/butadiene monomer systems to form styrene/butadiene elastomers is well known to those having skill in such art.

In practice, said free radical generating polymerization initiator for preparation of said synthetic elastomer particles may be selected from, for example, (A) dissociative initiators, or (B) redox initiators as described in the above referenced "Emulsion Polymerization Theory and Practice".

Such free radical generating polymerization initiators are well known to those having skill in such art.

In practice, said aqueous mixture of water and said polymeric quaternary amine and said aqueous mixture of water and inorganic acid are preferably added substantially simultaneously to said first blend of emulsion of elastomer particles and water swelled, water swellable clay particles.

In practice, said inorganic acid for adding to said first blend may be selected from mineral acids such as for example, sulfuric acid, nitric acid, hydrochloric acid and phosphoric acid. Also, organic acids such as, for example, formic acid, and acetic acid may be used, although the mineral acids are preferred.

In practice, for said acid/salt combination, said aqueous mixture of water and acid, preferably an inorganic acid, may, if desired, also contain a water soluble salt selected from, for example, at least one of sodium chloride, potassium chloride, sodium sulfate, potassium sulfate, magnesium chloride, magnesium sulfate, aluminum sulfate, potassium carbonate and tripotassium phosphate.

In practice, said water for said aqueous mixture of water and water swellable clay is preferably provided in a de-mineralized form, or at least without an appreciable mineral content.

In practice, as at least partially hereinbefore discussed, said water swellable clay may be selected from smectite clay, vermiculite based clays and mica clays, preferably a smectite clay selected from at least one of montmorillonite, hectorite, nontrite, beidellite, volkonskoite, saponite, sauconite, sobockite, sterensite, and sinfordite clays of which montmorillonite and hectorite clays are preferred.

In practice, said cationic polymeric quaternary amine is a polymeric quaternary amine (preferably, although not necessarily, water soluble at 23° C.) which contains at least two quaternary amine centers, or moieties, (e.g. an average of from 2 to about 4 quaternary amine moieties) and is not normally considered as being a surfactant. Such polymeric quaternary amine is considered herein as being a cationic polyelectrolyte, so long as it is not considered as being a surfactant and contains at least two quaternary amine centers. Representative of various cationic polyelectrolytes are described in *Polymeric Materials Encyclopedia*, Volume 8, (1996), published by CRC Press, Inc., which Pages 5837 through 5849 are incorporated herein by reference in their entirety.

The cationic polymeric amine may typically be provided as a product of a reaction of suitable reactants in a form of a mixture of materials of which a significant, and preferably a major, component is the cationic polyelectrolyte as a cationic polymeric quaternary amine.

An example on Pages 5838 and 5839 of aforesaid *Polymeric Materials Encyclopedia* illustrates a reaction of epichlorohydrin and a tertiary amine, in the presence of hydrochloric acid, to provide a product as a mixture of materials of which a major portion is contemplated herein as being a cationic polyelectrolyte, namely a cationic polyelectrolyte, and particularly a cationic polymeric quaternary amine having at least two quaternary amine moieties and thus is considered herein as being polymeric in nature at least insofar as requiring the at least two quaternary amine moieties.

The products of such reaction are considered herein to be complex except it is understood that a significant byproduct is the liquid polymeric quaternary amine composed of two quaternary amine centers, or moieties. Such reactants may be represented as the following with the product understood as being a complex mixture of materials. Such reactants might be represented as:

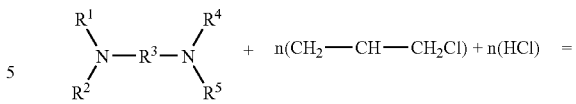

It is considered herein, for the above tertiary diamine, that $R^1$, $R^2$, $R^4$ and $R^5$ radicals may be methyl groups (radicals), and $R^3$ may be —$(CH_2)_m$—, where m is a value of from 2 to 3, although, alternately, one or two of the R radicals may be hydrogen.

A further example of such cationic polymeric quaternary amine is a mixture of poly(alkylene amines), for example, poly(ethylene amines), wherein a significant (e.g. major) component is a water soluble, non-surfactant, cationic polymeric quaternary amine which contains at least two quaternary amine moieties, or groups.

In practice, it is to be appreciated that the method of this invention may desirably rely, at least in part, on the use of the acid or salt/acid combination to aid in destabilizing the anionic emulsion and thereby coagulating/precipitating the anionic elastomer particles/clay particle mixture. A relatively minimal amount of cationic polymeric quaternary amine is desired to be used to intercalate the water swelled clay as well as to coagulate (precipitate) the elastomer particles and intercalated clay. However, it is to be appreciated that it contemplated herein that the cationic polymeric quaternary amine may be used for such purpose without use of the acid or salt/acid combination.

The said monomers for the preparation of said pre-formed elastomer particles may, if desired, also contain a minor amount (e.g. from about 0.1 to about 20, alternately about 0.1 to about 5, weight percent based on the total monomers) of an elastomer functionalizing monomer selected from, for example, hydroxypropyl acrylate, hydroxypropyl methacrylate (HPMA), 2-(dimethylamino)ethyl methacrylate, 4-anilinophenyl methacrylamide, 2-hydroxyethyl acrylate, 2-hydroxyethyl methacrylate, 2-vinylpyridine and 4'-pyrollidino-4-ethyl-styrene.

In further accordance with this invention, a nanocomposite is provided which is comprised of at least one elastomer which contains a dispersion therein of an at least partially exfoliated, cationic polymeric quaternary amine-intercalated water swellable clay particles.

In additional accordance with this invention, a nanocomposite comprised of an elastomer which contains a dispersion therein of said in situ formed partially exfoliated, intercalated, water swellable clay is provided as prepared by the process of this invention.

Accordingly, as hereinbefore discussed, said nanocomposite may be comprised of, based on 100 parts by weight of the elastomer host, from about 0.5 to about 80, about 5 to about 80 or, alternately about 5 to about 45, parts by weight of said in situ formed partially exfoliated, intercalated, water swellable clay.

In practice, the resulting nanocomposite may be blended with additional elastomers to create a rubber composite. For example, rubber composites may be prepared by blending the nanocomposite with various additional diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alpha methylstyrene, preferably styrene.

Representative of such additional conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), vinyl polybutadiene having a vinyl 1,2-content in a range of about 15 to about 90 percent, isoprene/butadiene copolymers, and styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, additional particulate reinforcement for the nanocomposite and/or rubber composite, in addition to the exfoliated platelets, may also include carbon black and/or particulate synthetic amorphous silica, particularly precipitated silica, or a combination of carbon black and such amorphous silica, usually of an amount in a range of about 5 to about 100 alternately about 5 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

In further accordance with this invention, a rubber composition is provided which comprises, based upon parts by weight per 100 parts by weight elastomer (phr):

(A) about 5 to about 150, alternately about 5 to about 115, phr of the nanocomposite of this invention, (B) from zero to about 95, alternately from about 5 to about 95, phr of at least one additional diene-based elastomer, so long as the total of the elastomer contained in said nanocomposite and said additional diene-based elastomer is 100 parts by weight, (C) from zero to about 80, alternately from about 10 to about 80, alternately about 10 to about 60 phr of at least one additional reinforcing particulate filler selected from carbon black, precipitated silica aggregates, silica-containing carbon black which contains domains of silica on its surface, and mixtures thereof, and, optionally (D) a coupling agent which contains a moiety reactive with hydroxyl groups (e.g. silanol groups) contained on the peripheral edges of the surface of the platelets of said exfoliated platelets and reactive with hydroxyl groups (e.g. silanol groups) contained on the surface of said precipitated silica and said silica-containing carbon black, if said silica and/or silica-containing carbon black is used, and another moiety which is interactive with said diene-based elastomer(s) of the elastomer(s) of said nanocomposite and at least one of said additional elastomers.

In accordance with this invention, a nanocomposite is provided which is comprised of at least one elastomer which contains a dispersion therein of an at least partially exfoliated, cationic polymeric quaternary amine or ethylene polyamine intercalated water swellable clay particles, wherein said polymeric quaternary amine and ethylene polyamine contain at least two amine centers.

In additional accordance with this invention, a rubber composite, or composition, is provided as a blend of at least one additional elastomer and said nanocomposite, as well as a process of preparing a rubber composite by preparing said nanocomposite and then blending at least one elastomer, particularly a diene-based elastomer, therewith.

In further accordance with this invention an article of manufacture is provided having at least one component comprised of said nanocomposite and/or said rubber composite, or rubber composition, as well as a process of preparing an article of manufacture by preparing said nanocomposite and/or said rubber composite and then preparing said article of manufacture.

In additional accordance with this invention, an article of manufacture is provided having at least one component comprised of a nanocomposite comprised of at least one elastomer which contains a dispersion a dispersion of an at least partially exfoliated, cationic polymeric quaternary amine or ethylene polyamine intercalated water swellable clay particles, wherein said polymeric quaternary amine and ethylene polyamine contain at least two amine centers, and particularly including the said nanocomposite.

In further accordance with this invention said article of manufacture includes industrial product such as, for example, and the following are not intended to be limiting, at least one of a conveyor belt, a power transmission belt, hose, motor mounts and tank track pads which have at least one component comprised of said nanocomposite and/or said rubber composite.

In additional accordance with this invention, a tire is provided having at least one component comprised of said nanocomposite and/or said rubber composite. In one aspect of the invention, said component may be, for example, a tire tread, tire innerliner, tire sidewall insert (particular a tire sidewall supporting and/or stiffening component positioned within the tire sidewall) as well as a process of preparing a tire by preparing said nanocomposite and/or said rubber composite and then preparing said tire.

In further accordance with this invention, a tire is provided having at least one component, such as for example a tread, of a rubber composition comprised of at least one diene-based elastomer and the nanocomposite of this invention wherein said rubber composition contains a carbon black reinforcing filler and wherein at least a portion of said carbon black reinforcement is replaced by said partially exfoliated, intercalated, clay particles contained in said nanocomposite. Exemplary thereof is such rubber composition which contains at least 1, and preferably a range of about 3 to about 10, phr of said partially exfoliated, intercalated clay particles.

A particularly representative tire is an aircraft tire with a stiff carcass composed of at least six, or more, fabric reinforced carcass rubber plies which support a circumferential tread configured with a running surface of circumferential ribs of a rubber composite, or composition, comprised of:

(A) the nanocomposite of this invention blended with (B) at least one additional elastomer selected from at least one of cis 1,4-polybutadiene, cis 1,4-polyisoprene, and additional styrene/butadiene copolymer elastomer; and (C) optionally carbon black reinforcing filler;

wherein said nanocomposite is comprised of the styrene/butadiene copolymer elastomer (E-SBR) and/or natural cis 1,4-polyisoprene elastomer which contains the in situ formed dispersion therein of from about 5 to about 80, alternately about 5 to about 45, parts by weight of said partially exfoliated, intercalated clay particles per 100 parts by weight of said elastomer(s) of said nanocomposite.

In practice, it is considered herein that said rubber composition for said aircraft tire, may contain, for example, reinforcing filler as said clay particles from said nanocomposite in a range of from one to about 30 parts by weight per 100 parts of elastomer and optionally carbon black in a range of from zero to about 60 parts by weight per 100 parts of elastomer, although higher or lower amounts may be used, depending upon circumstances.

In practice, it may be desired for the weight ratio of the elastomer of said nanocomposite to an additional elastomer to be in a range, for example, of from about 5/1 to about 1/5, although higher or lower ratios may be used, depending upon circumstances, to prepare a rubber composition for an article of manufacture. However, it is to be appreciated that, depending upon circumstances, the nanocomposite may be used without inclusion of any additional elastomer to produce a rubber composition for an article of manufacture.

In practice, it is contemplated that use of such in situ formed partially exfoliated, intercalated clay particles for the rubber reinforcement may present an increased reinforcement efficiency for elastomers, particularly diene-based elastomers in a manner that a portion of normally used carbon black reinforcement, or even silica reinforcement, may be replaced so that the overall particulate reinforcement for the elastomer, or rubber product is reduced and in some cases, substantially reduced. For example, it is contemplated that a weight ratio of such clay particles to replaced carbon black and/or amorphous, precipitated silica, may range from about 6/1 to somewhat greater than about 1/1, and alternately such a weight ratio in a range of from about 5/1 to about 1.5/1, to often achieve substantially similar or equal physical properties of the rubber composition, all depending upon the rubber composition itself and its intended use. Thus one part by weight of the in situ formed partially exfoliated, intercalated clay particles might replace from at least one and perhaps up to 6 parts by weight carbon black and/or silica reinforcement. Thus, it is considered herein that, in general, such clay particles may have an increased reinforcement efficiency for diene-based elastomers as compared to rubber reinforcing carbon black and/or amorphous, precipitated silica.

Commonly employed synthetic amorphous silica, or siliceous pigments, used in rubber compounding applications can be used as the silica in this invention, wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3$/100 g, and more usually about 100 to about 300 $cm^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2, VN3 and Ultrasil 7005, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge, preferably from 2 to 2.6 sulfur atoms, may be used and particularly a bis(3-triethoxysilylpropyl)polysulfide.

It is readily understood by those having skill in the art that the nanocomposite, or rubber composite, would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and, optionally, reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is typically conducted in the presence of a sulfur vulcanizing agent, although peroxide and other non-sulfur curing agents may sometimes be suitably employed to vulcanize the elastomers. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to preparation of nanocomposites as well as rubber composites which contain such nanocomposites as well as manufactured articles, including tires, which have at least one component comprised of said nanocomposites and/or rubber composites.

The preparation of a rubber composite, namely the mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and optionally additional reinforcing fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

Preparation of Anionic Latex of Styrene/Butadiene Elastomer (E-SBR)

An anionic aqueous latex of an emulsion polymerization prepared styrene/butadiene copolymer elastomer (E-SBR) having a basic pH in a range of about 9.5 to 10.5 was synthesized by copolymerizing styrene and 1,3 butadiene monomers in an aqueous medium.

For the preparation of the E-SBR latex, a cold (10° C.) emulsion polymerization process was used through a series of sequential continuously stirred reactors in which a monomer mixture of 30 weight percent styrene and 70 weight percent 1,3-butadiene was charged to the first reactor.

The monomer charge, together with an aqueous activator solution, aqueous soap (surfactant) solution, polymerization modifier and initiator were continuously charged to the first reactor.

The activator solution was a mixture of ferrous sulfate heptahydrate (in an amount of about 0.009 phm) where phm is parts by weight per 100 parts by weight of monomer sodium formaldehyde sulfoxylate dihydrate (in an amount of about 0.07 phm), tetrasodium ethylenediaminetetraacetate (in an amount of about 0.035 phm) and water (in an amount of about 9.97 phm). The soap solution was a mixture of mixed C14-C18 and C16-C18 unsaturated fatty acids (in an amount of about 2.34 phm), a potassium salt of disproportionated rosin acid (in an amount of about 1.4 phm), potassium chloride (in an amount of about 0.23 phm), tripotassium phosphate (in an amount of about 0.05 phm), diluted sodium hydroxide (in an amount of about 0.16 phm) and 50 weight percent potassium hydroxide (in an amount of about 0.18 phm). The initiator was pinane hydroperoxide (in an amount of about 0.05 phm).

The polymerization was terminated at a conversion of the monomers to polymer of about 62 to 65 percent with an isopropyhydroxylamine (in an amount of about 0.04 phm) solution containing 50 weight percent potassium hydroxide (in an amount of about 0.02 phm) and water (about 8 phm).

EXAMPLE II

Preparation of E-SBR/Clay Nanocomposite

An aqueous suspension of 249 grams of non-intercalated (without pre-treatment with an intercalant such as, for example, a quaternary ammonium), water-swelled montmorillonite clay as Cloisite NA+™ from the Southern Clay Products Company in 12,235 grams of hot water (60° C.) was prepared by stirring the clay/water mixture for about 2 hours.

To the clay/water suspension was added about 11.5 kilograms (about 25.3 pounds) of the E-SBR latex of Example I as 21.7 weight percent E-SBR solids containing about 1.5 phr (parts by weight per 100 parts by weight rubber) conventional antidegradant at ambient temperature (about 23° C.) and thoroughly mixed. An additional about 12.5 kilograms (about 27.5 pounds) of water was added.

To the stirred mixture of clay/water/latex was added about 2 kilograms water solution of 10 weight percent polymeric quaternary amine mixture as Perchem 503™ from the Petrolite Company dropwise at ambient temperature.

A clay/E-SBR nanocomposite precipitated from the dispersion/solution considered herein as being composed of the E-SBR and an in situ formed at least partially exfoliated, intercalated clay particles. After the addition was completed, the precipitated nanocomposite was centrifuged and washed with water.

The resulting washed nanocomposite was tray dried on cloth lined trays in a forced air oven at about 66° C. (about 150° F.). The dried nanocomposite had a Mooney ML(1+4) viscosity value of about 75 and was comprised of about 10 phr of the clay particles.

EXAMPLE III

Preparation of Control E-SBR Without Clay

A control E-SBR without clay was prepared by slowly adding about 11412 kilograms (about 2513 pounds) of the SBR latex (21.7 weight percent solids) of Example I to stirred mixture of about 22.7 kilograms (about 50 pounds) of water and 400 grams of a polymeric quaternary amine (Perchem 503™), having a pH in a range of from 3 to 4 having been adjusted with dilute sulfuric acid, at a temperature of about 60° C. (about 140° F.). The resulting coagulated E-SBR crumb was washed with water and oven dried at about 66° C. (about 150° F.). The Mooney (ML 1+4) viscosity value of the dried E-SBR was about 53.

EXAMPLE IV

Preparation of Additional E-SBR/Clay Nanocomposite

A clay/water suspension of 249 grams of water-swelled montmorillonite clay as Cloisite NA+™ from the Southern Clay Products Company in about 12.2 kilograms of hot water (60° C.) was prepared by stirring the clay/water mixture for about 2 hours in a first container.

A container of clay/E-SBR/water suspension was prepared by adding to the clay/water suspension about 11.8 kilograms (about 26 pounds) of the E-SBR latex of Example I as 21.6 weight percent E-SBR solids containing about 1.5 phr (parts by weight per 100 arts by weight rubber) conventional antidegradant at ambient temperature (about 23° C.) and thoroughly mixed.

To a second container which contained about 12.5 kilograms (about 27.5 pounds) of water maintained at a pH in a range of 3 to 4 via addition of dilute sulfuric acid, was added at ambient temperature (23° C.) over a period of about 30 to 40 minutes, simultaneously:

(A) the clay/E-SBR/water mixture of the first container, and (B) 1100 grams of a cationic polymeric quaternary amine as 5 percent Perchem 503™ in water dropwise via a small pump.

A clay/E-SBR nanocomposite precipitated from the dispersion/solution as considered herein as being composed of the E-SBR and an in situ formed at least partially exfoliated, intercalated clay particles. After the addition was completed, the precipitated nanocomposite was centrifuged and washed with water. The resulting nanocomposite crumb was tray dried in cloth lined trays in a forced air oven at about 66° C. (about 150° F.). The dried nanocomposite had a Mooney (ML 1+4) viscosity value of about 72.

On a dry basis, the nanocomposite was considered herein to be composed of approximately 10 phr of in situ formed at least partially exfoliated, intercalated clay particles (parts by weight of clay per 100 parts by weight of the E-SBR).

EXAMPLE V

Preparation of Natural Rubber/Clay Nanocomposite

To about 4.1 kilograms (about 9 pounds) of natural cis 1,4-polyisoprene rubber latex (high ammonia, 61 percent solids latex) was added about 8.2 kilograms (about 18 pounds) of soft water and therefore considered herein as being a demineralized water, and the mixture was stirred thoroughly. The pH of the diluted latex was about 10.8. To the diluted latex was added about 31.5 grams of a 20 weight percent Irganox 565™ antioxidant emulsion to thereby provide about 0.25 parts by weight of the Irganox 565 antioxidant per hundred parts of by weight of dry natural rubber. Thereafter, about 14.4 kilograms (about 31.8 pounds) of Cloisite NA+ clay slurry (about 2.6 percent solids) from Southern Clay Products was added to the diluted latex and the mixture thoroughly stirred. The clay/natural rubber latex was added to a first container which contained a bottom outflow valve.

To a second container at ambient temperature (e.g. about 23° C.) was added about 12.3 kilograms (about 27 pounds) of soft water maintained at a pH of about 3 to about 4 by addition of dilute sulfuric acid, as required, over a period of about 30 to about 40 minutes.

Simultaneously, to the water in the second container, was added the clay/natural rubber latex from the first container (via its overflow valve) together with about 2200 grams of a 5 weight percent solution of cationic polymeric quaternary amine, the Perchem $_{503}$™ material, in water by dropwise addition via a small pump over a period of about 30 to about 40 minutes.

The resulting clay/natural rubber nanocomposite precipitated from the solution/latex as fine particles.

After the addition to the second container was completed, the precipitated fine nanocomposite particles were centrifuged and washed in the centrifuge with water. The resulting nanocomposite crumb was broken up into fine particles with cheese graters and tray dried on screen lined trays in a forced air oven at about 66° C. (about 150° F.).

On a dry basis, the nanocomposite was considered herein to be composed of approximately 15 phr of in situ formed at least partially exfoliated, intercalated clay particles (parts by weight of clay per 100 parts by weight of natural rubber).

EXAMPLE VI

Preparation of Control Natural Rubber (NR) Without Clay

Natural rubber latex (cis 1,4-polyisoprene elastomer anionic emulsion) was obtained from Goodyear Sumatra Rubber Plantations, Sumatera Utara, Indonesia. The latex was concentrated to about 50 percent solids for the sake of shipment with the emulsion being stabilized with ammonia. For this Example, a control coagulated natural rubber without clay addition can be prepared by slowly adding 981 kilograms the natural rubber latex (50 weight percent solids) as described above to a stirred mixture of 200 grams of water solution of a polymeric quaternary amine as 50 weight percent of Perchem 503™ together a slow addition of 45 kilograms of water having a pH in a range of from 3 to 4 having been adjusted with dilute sulfuric acid at a temperature of about 60° C. (140° F.). The resulting coagulated natural rubber crumb was washed with water and oven dried at about 66° C. (150° F.).

EXAMPLE VII

Preparation of Rubber Compositions

Rubber compositions containing various nanocomposites prepared by the methods described in Examples I through IV are prepared and identified herein as Control Sample A and Samples B through D.

Control Sample A is prepared of an aqueous polymerization prepared styrene/butadiene copolymer elastomer as described in Example III to which 50 phr of carbon black (N299) is blended to provide carbon black reinforcement. Sample A does not include the nanocomposites of Example II and IV.

Sample B is prepared of an E-SBR/clay nanocomposite (referred to herein as Nanocomposite X) prepared in a manner shown in Example IV except that it contained about 6 parts by weight of montmorillonite clay reinforcement pre-dispersed in 100 parts by weight of the E-SBR.

Sample C is prepared of an E-SBR/clay nanocomposite (referred to herein as Nanocomposite Y) prepared in a manner shown in Example IV except that it contained about 9 parts by weight of montmorillonite clay reinforcement pre-dispersed in 100 parts by weight of the E-SBR.

Sample D is prepared of an E-SBR/clay nanocomposite (referred to herein as Nanocomposite Z) prepared in a manner shown in Example IV except that it contained about 15 parts by weight of montmorillonite clay reinforcement pre-dispersed in 100 parts by weight of the E-SBR.

The compositions for the respective Samples are illustrated in the following Table 1 where the indicated ingredients were first mixed in an non-productive mixing stage (without curative) in an internal rubber mixer to a temperature of about 100° C., the mixture dumped from the mixer and allowed to cool to below 40° C. and then mixed in a productive mixing stage (with the curative) during which the curative is added for a brief period of time to a temperature of about 60° C. in an internal rubber mixer and the resulting mixture dumped from the mixer. The terms "non-productive" mixing and "productive" mixing are well known to those having skill in the rubber mixing art.

TABLE 1

| | Parts | | | |
|---|---|---|---|---|
| Material | Control Sample A | Sample B | Sample C | Sample D |
| Non-Productive mixing (to 100° C.) | | | | |
| Anionic SBR[1] | 100 | 0 | 0 | 0 |
| Carbon black[2] | 50 | 0 | 0 | 0 |
| Nanocomposite X (100 parts E-SBR plus 6 parts partially exfoliated, intercalated clay) | 0 | 106 | 0 | 0 |
| Nanocomposite Y (100 parts E-SBR plus 9 parts partially exfoliated, intercalated clay) | 0 | 0 | 109 | 0 |
| Nanocomposite Z (100 parts E-SBR plus 15 parts partially exfoliated, intercalated clay) | 0 | 0 | 0 | 115 |
| Productive mixing (to 60° C.) | | | | |
| Peroxide curative[3] | 0.3 | 0.3 | 0.3 | 0.3 |

[1]Styrene/butydiene elastomer prepared in Example III
[2]Carbon black as N299, an ASTM designation
[3]Dicumyl peroxide curative

EXAMPLE VIII

Rubber Composition Properties

Various viscoelastic properties of the Samples prepared in Example VII are reported in the following Table 2. The tests were carried out with DMTA (Dynamic Mechanical Thermal Analyzer, Model DMTA IV, manufactured by Rheometric Scientific) in tension mode at room temperature (e.g. at about 23° C.) in which E' and tan delta values were measured at various strains.

TABLE 2

| Properties | Control Sample A | Sample B | Sample C | Sample D |
|---|---|---|---|---|
| DMTA at room temperature, 11 Hertz | | | | |
| E' at 1% strain (MPa)[1] | 6.59 | 7.35 | 8.90 | 25.5 |
| E' at 5% strain (MPa) | 4.38 | 5.14 | 5.74 | 10.8 |
| E' at 7% strain (MPa) | 4.09 | 4.81 | 5.20 | 3.39 |

TABLE 2-continued

| Properties | Control Sample A | Sample B | Sample C | Sample D |
|---|---|---|---|---|
| Tan delta at 1% strain[2] | 0.34 | 0.13 | 0.18 | 0.29 |
| Tan delta at 5% strain | 0.35 | 0.17 | 0.24 | 0.38 |
| Tan delta at 7% strain | 0.35 | 0.18 | 0.25 | 0.39 |

[1]The E' values determined at one percent, five percent and seven percent strains,are a measure of dynamic storage modulus and are normally considered to be a measure of stiffness of the rubber composition, wherein an increase of E' value is a corresponding indication of an increase in stiffness of the rubber composition.
[2]The tan delta values determined at one percent, five and seven percent strains are a ratio of dynamic loss modulus to dynamic storage modulus and are normally considered to be a measure of hysteresis wherein a lower hysteresis is typically desirable as being indicative of better tire rolling resistance for a tire having a tread of the rubber composition (less resistance to rolling) and therefore associated with better vehicular fuel economy. A decrease in the tan delta value is typically a corresponding indication of a desirable decrease in hysteresis of the rubber composition.

It can be seen from Table 2 that Samples B and C which included the respective nanocomposites, as compared to Control Sample A which did not contain a nanocomposite, have a relatively similar, although higher, stiffness properties as indicated by similar, although higher, dynamic storage modulus E' values. However, the hysteresis of Samples B and C, as indicated by their tan delta values, are much lower than the Tan Delta value for Control Sample A. Therefore, it is considered herein that the inclusion of the nanocomposites in Samples B and C is significant and beneficial because decreased hysteresis of a rubber composition while substantially maintaining its stiffness is considered herein to be a typically desirable attribute for various components of a tire, including a tire tread, for tire performance.

It can also be seen from Table 2 that the rubber compositions of Samples B, C, and D, as compared to Control Sample A, have a significantly decreased reinforcement filler loading, or contents, namely the total of carbon black and clay reinforcement, and therefore an indicated lower specific gravity, or weight per unit volume, which is considered herein to be a typically desirable attribute for various components of a tire, including a tire tread, for tire performance and particularly where a lighter tire is desired for improved associated vehicle fuel economy.

EXAMPLE IX

Preparation of Rubber Compositions

Rubber compositions containing nanocomposites prepared in the manner of Examples I through IV are prepared and identified herein as Control Samples E and F and Samples G, H and J. There is no Sample I to avoid possible confusion with the Example I designation.

Control Sample E is prepared of an aqueous polymerization prepared styrene/butadiene copolymer elastomer described in Example I which is recovered and to which 10 phr of carbon black (N299) is blended to provide carbon black reinforcement. Control Sample E does not contain a nanocomposite.

Control Sample F is prepared of the same styrene/butadiene copolymer elastomer as Control Sample E to which 10 phr of a purified untreated (not water swelled and not intercalated) montmorillonite clay reinforcement (Cloisite NA+ from Southern Clay Products Co.) is dry blended with the styrene/butadiene copolymer elastomer in non-productive mixing stage, and the extent of clay intercalation and/or partial exfoliation is thereof formed by the physical mixing with the elastomer in this Example.

Sample G is prepared with an E-SBR/clay nanocomposite prepared in the manner of Example II, and referred to herein as Nanocomposite M, which contains 10 phr of the montmorillonite clay reinforcement pre-formed in situ in the elastomer emulsion matrix.

Sample H is prepared with an E-SBR/clay nanocomposite prepared in the manner of Example IV, and referred to herein as Nanocomposite N, which contains 10 phr of the montmorillonite clay reinforcement pre-formed in situ in the elastomer emulsion matrix.

Sample J is prepared according to Sample H except that 3 phr of a coupling agent (as a composite of coupling agent and carbon black) is blended with the rubber composition during the non-productive mixing step.

The mixtures are illustrated in the following Table 3 in terms of the aforesaid non-productive and productive mixing stages.

TABLE 3

| Material | Parts | | | | |
|---|---|---|---|---|---|
| | Control Sample E | Control Sample F | Sample G | Sample H | Sample J |
| Non-Productive Mixing Step (mixed to 100° C.) | | | | | |
| Anionic SBR[1] | 100 | 100 | 0 | 0 | 0 |
| Carbon black[2] | 10 | 0 | 0 | 0 | 0 |
| Nanocomposite M (100 parts E-SBR plus 10 parts partially exfoliated, intercalated clay) | 0 | 0 | 110 | 0 | 0 |
| Nanocomposite N (100 parts E-SBR and 10 parts partially exfoliated, intercalated clay) | 0 | 0 | 0 | 110 | 110 |
| Montmorillonite clay[3] | 0 | 10 | 0 | 0 | 0 |
| Antioxidant[4] | 2 | 2 | 2 | 2 | 2 |
| Zinc oxide | 5 | 5 | 5 | 5 | 5 |
| Stearic acid | 2 | 2 | 2 | 2 | 2 |
| Coupling agent composite[5] | 0 | 0 | 0 | 0 | 3 |
| Productive Mixing Step (mixed to 60° C.) | | | | | |
| Sulfur | 1.4 | 1.4 | 1.4 | 1.4 | 1.4 |
| Accelerators[6] | 1.25 | 1.25 | 1.25 | 1.25 | 1.25 |

[1]Styrene/butydiene elastomer prepared in Example III
[2]Carbon black as N299, an ASTM designation
[3]Montmorillonite clay as Cloisite NA+ (purified untreated sodium montmorillonite) from Southern Clay Products Co.
[4]Antioxidant as a polymerized 1,2 dihydro-2,2,4-trimethylquinoline
[5]Composite of coupling agent and carbon black in a 50/50 weight ratio obtained as Si266 from Degussa where the coupling agent is bis(3-triethoxysilylpropyl) polysulfide having an average of from 2 to 2.5 connecting sulfur atoms in its polysulfidic bridge
[6]Vulcanization accelerators as N-tert-butyl-2-benzothiazole sulfenamide and tetramethylthiuram disulfide.

EXAMPLE X

Tensile properties of the compositions prepared in Example IX, are reported in the following Table 4. In Table 4 the term "UTS" means "Ultimate Tensile System". The tests were carried out at room temperature with Instron Universal Testing Instruments Model 4201. The cross-head speed was set at 20 in/min (50.8 cm/minute).

TABLE 4

| | Control Sample E | Control Sample F | Sample G | Sample H | Sample J |
|---|---|---|---|---|---|
| Materials | | | | | |
| Montmorillonite clay | 0 | 10 | 0 | 0 | 0 |
| Nanocomposite M | 0 | 0 | 110 | 0 | 0 |
| Nanocomposite N | 0 | 0 | 0 | 110 | 110 |
| Properties UTS Determined Modulus/ Tensile/Elongation | | | | | |
| 10% modulus (MPa) | 0.36 | 0.33 | 0.49 | 0.58 | 0.56 |
| 50% modulus (MPa) | 0.87 | 1.1 | 1.4 | 1.5 | 1.6 |
| 100% modulus (MPa) | 1.3 | 2.0 | 2.5 | 2.7 | 2.8 |

TABLE 4-continued

|  | Control Sample E | Control Sample F | Sample G | Sample H | Sample J |
|---|---|---|---|---|---|
| 200% modulus (MPa) | 2.3 | 3.8 | 4.5 | 5.6 | 6.4 |
| 300% modulus (MPa) | 4.3 | — | 6.5 | 8.5 | 10.2 |
| Tensile strength (MPa) | 7.9 | 5.0 | 10.2 | 11.7 | 12.7 |
| Elongation at break (%) | 409 | 273 | 440 | 403 | 358 |

It can be seen from Table 4 that Control Sample F (with the physically mixed clay and without carbon black reinforcement), as compared with Control Sample E (with carbon black reinforcement instead of clay), having equal reinforcing filler loading, namely 10 phr, has a similar 10 percent modulus property, a somewhat increased 50 percent modulus property, and significantly increased 100 and 200 percent modulus properties.

However, Sample F, as compared to Control Sample E, has significantly reduced ultimate tensile strength and ultimate elongation at break properties, which is considered herein to be less desirable.

Significantly, it can also be seen from Table 4 that Sample G (which contained Nanocomposite M with the in situ formed, thereby pre-dispersed, partially exfoliated, intercalated, clay platelet reinforcement), as compared to Control Sample F (with the physically mixed clay reinforcement), though using the same amount of clay, has a significantly increased tensile modulus at various strains, as well as ultimate tensile strength, and elongation at break physical properties. These physical properties are considered herein to be typically desirable attributes for rubber compositions used in tire treads for tire performance. Better properties shown by Sample G, which contains Nanocomposite M prepared in the manner of Example II is indicative of substantial contribution of the pre-formed, anionic in situ created dispersion of partially exfoliated, intercalated clay dispersion as compared to Control Sample F with the physically mixed montmorillonite clay powder.

In summary, for Samples G, H, and J (which contained the in situ formed partially exfoliated, intercalated clay platelet reinforcement), a substantially increased tensile stiffness, ultimate tensile strength, and elongation are evident as compared to both Control Samples E and F which is indicative of substantial elastomer reinforcement contribution of pre-dispersed, anionic in situ formed, partially exfoliated, intercalated clay platelets beyond what may be obtained from conventional reinforcing filler such as rubber reinforcing carbon black (Control Sample E) and simple physically mixed montmorillonite clay (Sample F).

Sample J (in which the coupling agent is added), as compared to Sample H (without the coupling agent addition), shows further increased ultimate tensile strength with reduced ultimate elongation, which indicates the improved rubber/filler adhesion through the usage of coupling agent. This is considered herein to be a typically desirable attribute for various components of a tire, including a tire tread, for tire performance.

EXAMPLE XI

Rubber Composition Preparation

Rubber compositions which contain the coagulated natural rubber prepared by the process of Example VI are prepared and referred to in this Example as Control Samples K, L, M and N.

A rubber composition which contained the coagulated natural rubber/clay nanocomposite of Example VII is prepared and referred to herein as Sample O.

Control Samples K, L, M and N contained 30, 40, 50 and 60 phr, respectively, of carbon black (ASTM designated N299 carbon black) to provide various levels of carbon black reinforcement without a presence of exfoliated, intercalated clay reinforcement.

Sample O contains the natural rubber/clay nanocomposite prepared in the manner of Example VII which contains about 6 phr of the partially exfoliated, intercalated montmorillonite clay reinforcement prepared in situ within the anionic elastomer emulsion host.

The rubber composition Samples were prepared as illustrated in the following Table 5 in terms of non-productive and productive mixing stages in an internal rubber mixer to the indicated mixing temperatures. Such non-productive mixing (without sulfur curative) followed by productive mixing (with sulfur curative and accelerator) for sulfur vulcanizable diene-based rubber compositions is well known to those having skill in such art.

TABLE 5

| | Parts | | | | |
|---|---|---|---|---|---|
| Materials | Control Sample K | Control Sample L | Control Sample M | Control Sample N | Sample O |
| Non-Productive mixing (mixed to 100° C.) | | | | | |
| Natural rubber | 100 | 100 | 100 | 100 | 0 |
| Carbon black[1] | 30 | 40 | 50 | 60 | 30 |
| Nanocomposite[2] (100 parts natural rubber plus 6 parts partially exfoliated, intercalated clay) | 0 | 0 | 0 | 0 | 106 |

TABLE 5-continued

|  | Parts | | | | |
|---|---|---|---|---|---|
| Materials | Control Sample K | Control Sample L | Control Sample M | Control Sample N | Sample O |
| Antoxidant[3] | 1 | 1 | 1 | 1 | 1 |
| Zinc oxide | 3 | 3 | 3 | 3 | 3 |
| Stearic Acid | 2 | 2 | 2 | 2 | 2 |
| Processing Oil[4] | 5 | 5 | 5 | 5 | 5 |
| Productive mixing (mixed to 60° C.) | | | | | |
| Sulfur | 1.2 | 1.2 | 1.2 | 1.2 | 1.2 |
| Accelerators[6] | 1.6 | 1.6 | 1.6 | 1.6 | 1.6 |

[1]Carbon black as N299, an ASTM designation
[2]Nanocomposite as prepared in Example VII comprised of 100 phr of the natural rubber and a homogeneous dispersion therein of 6 phr of partially exfoliated, intercalated montmorillonite clay particles.
[3]Antioxidant as N-(1,3 dimethyl butyl)-N'-phenyl-p-phenylene diamine
[4]Processing oil as a naphthenic/paraffinic rubber processing oil.
[5]Vulcanization accelerator as N-tert-butyl-2-benzothiazole sulfenamide

EXAMPLE XII

Tensile and viscoelastic physical properties of the Samples prepared in Example XI are reported in the following Table 6.

In the Table, the term "RPA" refers to a Rubber Process Analyzer as RPA 2000™ instrument by Alpha Technologies, formerly the Flexsys Company and formerly the Monsanto Company. References to an RPA 2000 instrument may be found in the following publications: H. A. Palowski, et al, *Rubber World*, June 1992 and January 1997, as well as *Rubber & Plastics News*, Apr. 26 and May 10, 1993.

The "RPA" test results are reported as being from data obtained at 100° C. in a dynamic shear mode at a frequency of 11 hertz and at the reported dynamic strain values.

In the Table, the term "UTS" refers to "Ultimate Tensile System" using an Instron Universal Test Instrument Model 4201 and a cross-head speed of 20 inches/minute (50.8 centimeters/minute).

TABLE 6

|  | Control Sample K | Control Sample L | Control Sample M | Control Sample N | Sample O |
|---|---|---|---|---|---|
| Carbon Black | 30 | 40 | 50 | 60 | 30 |
| Exfoliated clay particles | 0 | 0 | 0 | 0 | 6 |
| Properties | | | | | |
| RPA at 100 C., 11 Hertz | | | | | |
| G' at 1% strain (MPa)[1] | 0.95 | 1.41 | 1.96 | 2.67 | 1.31 |
| G' at 5% strain (MPa) | 0.87 | 1.16 | 1.47 | 1.83 | 1.11 |
| G' at 10% strain (MPa) | 0.82 | 1.05 | 1.29 | 1.57 | 1.02 |
| Tan delta at 1% strain[2] | 0.028 | 0.064 | 0.092 | 0.118 | 0.065 |
| Tan delta at 5% strain | 0.057 | 0.088 | 0.121 | 0.149 | 0.086 |
| Tan delta at 10% strain | 0.057 | 0.090 | 0.118 | 0.141 | 0.089 |
| UTS Determined Modulus and Ultimate Tensile and Elongation | | | | | |
| 100% modulus (MPa) | 1.23 | 1.91 | 2.61 | 3.39 | 2.66 |
| 200% modulus (MPa) | 2.82 | 4.50 | 6.19 | 8.21 | 5.87 |
| 300% modulus (MPa) | 5.12 | 8.06 | 11 | 14.2 | 10.1 |
| Tensile strength (MPa) | 24.1 | 28.9 | 29.6 | 30.2 | 31 |
| Elongation at break (%) | 804 | 728 | 648 | 580 | 685 |

[1]The G' values determined at one percent, five percent and ten percent strains, are a measure of dynamic storage modulus and are normally considered to be a measure of stiffness of the rubber composition, wherein an increase of G' value is a corresponding indication of an increase in stiffness of the rubber composition.
[2]The tan delta values determined at one percent, five and ten percent strains are a ratio of dynamic loss modulus to dynamic storage modulus and are normally considered to be a measure of hysteresis wherein a lower hysteresis is typically desirable as being indicative of better tire rolling resistance for a tire having a tread of the rubber composition (less resistance to rolling) and therefore associated with better vehicular fuel economy. A decrease in the tan delta value is typically a corresponding indication of a desirable decrease in hysteresis of the rubber composition.

It can be seen from Table 2 that as carbon black loading was systematically increased from 30 phr in Control Sample K to 60 phr in Control Sample N, the rubber compounds' stiffness (G') were increased as well as hysteresis (increased tan delta values) proportionally. However, in Sample O, which contained the 6 phr of exfoliated, intercalated clay particles in the nanocomposite as well an addition of 30 phr of carbon black, both the G' (stiffness) as well as tan delta (hysteresis) values were similar to those of Control Sample K in which 40 phr of carbon black was added instead of the only 30 phr added for Sample O, which is considered herein to be desirable insofar as the successful replacement of a portion of the carbon black reinforcement with the exfoliated, intercalated clay particle reinforcement is concerned.

It can also be seen from Table 2 that, from UTS tests, the reported tensile moduli for Sample O are significantly higher than for Control Samples K and L (which contain 30 and 40 phr of carbon black, respectively), and is similar to 100 percent modulus for Control Sample M (which contains 50 phr of carbon black) and are just slightly below the 200 percent and 300 percent moduli for Control Sample M, (which contains 50 phr of carbon black).

This is considered herein to be desirable since it demonstrates the ability to use less overall reinforcing filler (36 phr of carbon black plus the exfoliated, intercalated clay particles of Sample O) to obtain relatively equal or similar G' (stiffness) and tan delta (hysteresis) physical properties as the 30 phr and 40 phr of carbon black-containing Control Samples K and L, respectively.

Indeed, less reinforcement filler loading in the respective rubber composition, with substantially equivalent rubber physical properties, translates into reduced weight for the rubber composition and for a tire having a component of such rubber composition and further, better fuel economy for an associated vehicle.

EXAMPLE XIII

Rubber compositions are prepared by blending nanocomposites composed of E-SBR and in situ formed partially exfoliated, intercalated, water swellable clay (montmorillonite clay) prepared in the manner of Example IV herein except that the nanocomposites for this Example contained 15, 30 and 45 parts by weight of the clay per 100 parts of the host elastomer instead of the 10 parts by weight of the clay of Example IV.

The rubber compositions for this Example are referred to as Control Sample P and Samples Q, R and S.

Control Sample P is a rubber composition comprised of cis 1,4-polybutadiene rubber, natural cis 1,4-polyisoprene rubber and synthetic cis 1,4-polyisoprene rubber. Control Sample P does not contain a nanocomposite.

Samples Q, R and S are rubber compositions similar to Control Sample P except that they contain the clay/E-SBR nanocomposites, where the individual nanocomposite might be referred to herein as a masterbatch. The nanocomposite masterbatches contained a dispersion of substantially exfoliated, intercalated clay (montmorillonite clay) in the above referenced amounts of 15, 30 and 45 parts by weight per 100 parts by weight of the clay particles. Table A illustrates the clay particles present in the nanocomposite masterbatches. The E-SBR had a styrene content of about 23.5 weight percent based upon the styrene/butadiene copolymer itself.

TABLE A

| Sample | Clay Content (parts by weight of exfoliated, intercalated clay in per 100 parts by weight of the E-SBR of the nanocomposite) |
|---|---|
| Nanocomposite A (for Sample Q) | 15 |
| Nanocomposite B (for Sample R) | 30 |
| Nanocomposite C (for Sample S) | 45 |

The ingredients illustrated in the following Table 7 were first mixed in a non-productive mixing stage (without curative) in an internal rubber mixer to a temperature of about 160° C., the mixture dumped from the mixer and allowed to cool to below 40° C. and then mixed in a productive mixing stage, during which the curative is added, for a brief period of time to a temperature of about 110° C. in an internal rubber mixer and the resulting mixture dumped from the mixer. The terms "non-productive" mixing and "productive" mixing are well known to those having skill in the rubber mixing art.

TABLE 7

| Material | Parts by weight total rubber (phr) |
|---|---|
| Non-Productive Mixing (mixed to 160° C.) | |
| Cis 1,4-polybutadiene rubber[1] | 37.5 |
| Natural cis 1,4-polyisoprene rubber | 30 |
| Synthetic cis 1,4-polyisoprene rubber[2] | 10 |
| Styrene/butadiene rubber[3] | 0 and 41.25 |
| Nanocomposite A (15 parts clay) | 0 and 34.5 |
| Nanocomposite B (30 parts clay) | 0 and 39 |
| Nanocomposite C (45 parts clay) | 0 and 43.5 |
| Carbon black | variable (see Table B) |
| Stearic acid | 2.5 |
| Zinc oxide | 5 |
| Processing oil | 0 and 20 (see Table B) |
| Productive Mixing (mixed to 110° C.) | |
| Sulfur | 0.75 |
| Accelerator(s)[4] | 2.5 |

[1]Synthetic cis 1,4-polybutadiene rubber as Budene 1254 ™ from The Goodyear Tire & Rubber Company
[2]Synthetic cis 1,4-polyisoprene rubber as Natsyn 2200 ™ from The Goodyear Tire & Rubber Company
[3]Styrene/butadiene rubber as PLIOFLEX 1712 ™ from The Goodyear Tire & Rubber Company
[4]Vulcanization accelerators as benzothiazole disulfide and dithiodimorpholine types Control Sample P is a rubber composition comprised of cis 1,4-polybutadiene rubber, natural cis 1,4-polyisoprene rubber, synthetic cis 1,4-polyisoprene rubber and styrene/butadiene copolymer elastomer prepared via aqueous polymerization in a manner described in Example III to which 65 phr of carbon black (N220) is blended to provide carbon black reinforcement without the partially exfoliated intercalated clay.

Sample Q is prepared with Nanocomposite A masterbatch, namely a nanocomposite masterbatch prepared similar to Example IV except for the clay content, where the nanocomposite masterbatch A contained about 15 parts by weight of the partially exfoliated, intercalated montmorillonite clay reinforcement per 100 parts by weight of the E-SBR host of the nanocomposite (4.5 phr of the clay particles in the overall rubber composition), together with 45 phr of N220 carbon black being added to the overall rubber composition.

Sample R is prepared with Nanocomposite B masterbatch, namely a nanocomposite masterbatch prepared similar to Example IV except for the clay content, where the nanocomposite masterbatch B contained about 30 parts by weight of the partially intercalated and partially exfoliated montmorillonite clay reinforcement per 100 parts by weight of the elastomer host of the nanocomposite (9 phr of the clay particles in the overall rubber composition), together with 38 phr of N220 carbon black being added to the overall rubber composition.

Sample S is prepared with Nanocomposite C masterbatch, namely a nanocomposite masterbatch prepared similar to Example IV except for the clay content, where the nanocomposite masterbatch C contained about 45 parts by weight of the partially intercalated and partially exfoliated montmorillonite clay reinforcement per 100 parts by weight of the elastomer host of the nanocomposite (13.5 phr of the clay particles in the overall rubber composition), together with 25 phr of N220 carbon black being added to the overall rubber composition.

A summary of the amounts of nanocomposites, in terms of amounts of the individual nanocomposites contained in Samples Q, R and S, together with the carbon black additions for Samples Q, R and S, and for the E-SBR and carbon black contained in Control Sample P, are shown in the following Table B.

TABLE B

| | Parts | | | |
|---|---|---|---|---|
| | Sample P | Sample Q | Sample R | Sample S |
| E-SBR | 30 | 0 | 0 | 0 |
| Carbon black | 65 | 45 | 38 | 25 |
| Nanocomposite A | 0 | 34.5 | 0 | 0 |
| Nanocomposite B | 0 | 0 | 39 | 0 |
| Nanocomposite C | 0 | 0 | 0 | 43.5 |
| Clay content in Sample | 0 | 4.5 | 9 | 13.5 |

EXAMPLE XIV

Various viscoelastic properties of the Control Sample P and Samples Q, R and S of Example XIII are reported in the following Table 8. The tests were carried out with RPA (previously described), MTS and ATS instrument or instrument systems. The term "MTS" refers to "Material Test System", model 810, from the MTS company. The term "ATS" refers herein to an "Automated Testing System" in which a variety of tests are preformed on a variety of instruments such as for example ring modulus, rebound, Shore A hardness and specific gravity. In particular, the tests are performed on an Instron model 4201 instrument (e.g. ring modulus, tensile strength and elongation values), Zwick rebound instrument (for rebound values), and Wallace densimeter apparatus. Such instrumentation and tests are well known to those having skill in such art.

TABLE 8

| | Control | | | |
|---|---|---|---|---|
| Properties | Sample P | Sample Q | Sample R | Sample S |
| ATS | | | | |
| 100% modulus (MPa) | 2.11 | 1.87 | 1.97 | 2.11 |
| 300% modulus (MPa) | 9.57 | 8.39 | 8.98 | 9.32 |
| Ultimate tensile strength (MPa) | 18.9 | 20.0 | 20.2 | 18.6 |
| Ultimate elongation (%) | 547 | 593 | 590 | 559 |
| Shore A hardness (23° C.) | 74.3 | 67.6 | 65.4 | 67 |
| Shore A hardness (100° C.) | 66.1 | 60.1 | 59.4 | 61.3 |
| Rebound (23° C.) | 37.5 | 43.7 | 45.2 | 44.5 |
| Specific Gravity (g/cm$^3$) | 1.144 | 1.116 | 1.113 | 1.127 |
| RPA 500 (kPa) | | | | |
| Uncured G', 15% strain, 0.83 hertz, 100° C. | 279.7 | 244.1 | 231.3 | 255.1 |
| G', 100° C., 1% strain, 1.0 hertz | 3522 | 2263 | 2141 | 2253 |
| G', 100° C., 10% strain, 1.0 hertz | 1746 | 1379 | 1338 | 1414 |
| G', 100° C., 50% strain, 1.0 hertz | 1037 | 905 | 902 | 966 |
| Tan delta, 100° C., 10% strain, 1.0 hertz | 0.17 | 0.13 | 0.12 | 0.12 |
| MTS (Dynamic Modulus) | | | | |
| E" (N/square mm) | 2.62 | 1.38 | 1.36 | 1.55 |
| E' (N/square mm) | 15.5 | 11.2 | 10.6 | 11.4 |
| Loss compliance (mm$^2$/N) | 0.011 | 0.011 | 0.012 | 0.012 |
| Tan delta, 23° C. | 0.169 | 0.123 | 0.129 | 0.135 |
| Static load (N) | 75.2 | 61.4 | 65.6 | 70.2 |
| DIN Abrasion, (10 N), relative volume loss (mm$^3$) | 116 | 110 | 98 | 116 |

The G' values are a measure of stiffness of the rubber sample in torsional shear and are normally considered to be a measure of elastic shear modulus of the rubber composition, wherein an increase of G' is a corresponding indication of compositional stiffness of the rubber sample especially under torsion.
The E' values are a measure of dynamic storage modulus and are normally considered to be a measure of stiffness of the rubber composition, wherein an increase of E' value is a corresponding indication of an increase in stiffness of the rubber composition.

It can be seen from Table 8 that Samples Q, R and S, as compared to Control Sample P, exhibit significant reductions in tan delta values and significant increases in rebound values which is indicative of significant decrease in hysteresis which, in turn, is indicative of a reduction in heat buildup (increase in temperature) of the rubber composition when being worked under load.

Therefore, use of the exfoliated, intercalated clay (formed as a dispersion in situ within the E-SBR host) in place of a portion of the carbon black reinforcement is seen herein to provide a substantial reduction in heat build up (significant decrease in hysteresis) while still maintaining adequate reinforcement and stiffness for the rubber composition. The inclusion of the exfoliated, intercalated clay is therefore seen herein to render a significant beneficial physical property tread-off for the rubber composition in that it provides an allowance of providing a suitable stiffness of the rubber composition while reducing its hysteresis.

It can also be seen that Samples Q, R and S, as compared to Control Sample P, are of a significantly lower specific gravity, and therefore exhibit a significant weight reduction, primarily because of the use of the exfoliated, intercalated clay (formed as a dispersion in situ within the E-SBR host) to replace a portion of the carbon black reinforcement. Additionally, it is to be appreciated that the modulus/tensile/elongation and abrasion resistance properties of Samples Q, R and S are similar to those of Control Sample P.

These aspects are considered herein to be particularly suitable for rubber compositions for components of tires and particularly for aircraft tire treads, in which a reduction in hysteresis is significantly desirable for aircraft tire treads to reduce heat buildup and therefore promote tire durability for aircraft take-offs and landings, and is a reduction in weight of the aircraft tire tread itself is significantly desirable to conserve the vehicular fuel (fuel economy) for the aircraft both on the ground in the air.

While various embodiments are disclosed herein for practicing the invention, it will be apparent to those skilled in this art that various changes and modifications may be made therein without departing from the spirit or scope of the invention.

What is claimed is:

1. A process of preparing a nanocomposite comprised of an elastomer and at least partially exfoliated, intercalated water-swellable clay, which comprises
   (A) forming a first blend of water-swelled clay and anionic aqueous emulsion of elastomer particles by blending:
      (1) an aqueous mixture comprised of water and a multilayered water-swellable clay, exclusive of an intercalant for said clay, wherein said water-swellable clay is comprised of a plurality of stacked platelets with water-expanded galleries between said platelets, wherein said galleries contain naturally occurring cationic ion exchangeable ions therein, and
      (2) an anionic emulsion of synthetic elastomer particles as an aqueous pre-formed elastomer emulsion having a pH in a range of from about 6 to about 11 and exclusive of a thermoplastic polymer latex, comprised of said synthetic elastomer particles prepared by aqueous free radical induced polymerization of monomers in the presence of a free radical generating polymerization initiator and non-polymerizable anionic surfactant,
      wherein said synthetic elastomer particles are derived from an aqueous polymerization of monomers comprised of styrene and at least one of isoprene and 1,3-butadiene monomers or at least one of isoprene and 1,3-butadiene monomers or acrylonitrile and at least one of isoprene and 1,3-butadiene monomers, or
      (3) an anionic emulsion of natural cis 1,4-polyisoprene elastomer particles, and
   (B) blending with said first blend
      (1) an aqueous mixture comprised of water and amine having at least two amine centers selected from a cationic polymeric quaternary amine and ethylene polyamine, and optionally
      (2) an aqueous mixture comprised of water and inorganic acid having a pH in a range of about 3 to about 4;
      wherein said free radical polymerization initiator is an anionic aqueous polymerization initiator comprised of at least one of potassium peroxydisulfate and ammonium peroxydisulfate.

2. The process of claim 1 wherein said monomers for said synthetic elastomer particles are derived from aqueous emulsion polymerization of:
   (A) styrene and 1,3-butadiene monomers comprised of from about 0.1 to about 40 weight percent styrene monomer,
   (B) styrene and isoprene monomers which comprised of from about 0.1 to about 40 weight percent styrene monomer,
   (C) isoprene monomer,
   (D) 1,3-butadiene monomer,
   (E) isoprene and 1,3-butadiene monomers
   (F) 1,3-butadiene and acrylonitrile monomers comprised of about 5 to about 45 weight percent acrylonitrile monomer; or
   (G) isoprene and acrylonitrile monomers comprised of about 5 to about 45 weight percent acrylonitrile monomer.

3. The process of claim 1 wherein from about 0.5 to about 80 parts by weight of said water swelled clay is added to said anionic emulsion per 100 parts by weight of said elastomer particles.

4. A nanocomposite prepared according to claim 3 which contains about 0.5 to about 80 parts by weight of said at least partially exfoliated, intercalated clay per 100 parts by weight of said elastomer host.

5. The process of claim 1 wherein said synthetic elastomer particles are derived from an aqueous polymerization of monomers comprised of styrene and 1,3-butadiene or are an anionic emulsion of natural cis 1,4-polyisoprene elastomer particles.

6. The process of claim 1 wherein said monomers for the said preparation of said synthetic elastomer also contain:
   (A) from about 0.1 to about 20 weight percent, based upon the total monomers, of an additional copolymerizable monomer, selected from at least one of alkyl acrylates, alkyl methacrylates, acrylamide, methacrylamide, N-alkylacrylamide, N-alkyl methacrylamide, N,N-dialkyl acrylamide and N,N-dialkyl methacrylamide, wherein said alkyl groups contain from one through four carbon atoms; alpha methylstyrene, 2-vinyl pyridine and/or 4-vinyl pyridine, and/or;
   (B) from about 0.1 to about 20 weight percent, based on the total monomers, of an elastomer functionalizing monomer selected from hydroxypropyl acrylate, hydroxypropyl methacrylate (HPMA), 2-(dimethylamino) ethyl methacrylate, 4-anilinophenyl methacrylamide, 2-hydroxyethyl acrylate, 2-hydroxyethyl methacrylate and 4'-pyrollidino-4-ethyl-styrene.

7. The process of claim 1 wherein said amine having at least two amine centers is a cationic quaternary amine.

8. The process of claim 1 wherein said amine having at least two amine centers is an ethylene diamine.

9. The process of claim 1 wherein said water swellable clays are selected from at least one of water-swellable smectite clays, vermiculite clays and mica clays.

10. The process of claim 1 wherein said water-swellable clay is a smectite clay selected from at least one of montmorillonite, hectorite, nontrite, beidellite, volkonskoite, saponite, sauconite, sobockite, stevensite, and sinfordite clays.

11. The process of claim 1 which further comprises preparing rubber composition which contains said nanocomposite, wherein said rubber composition comprises, based upon parts by weight per 100 parts by weight elastomer (phr):

(A) about 5 to about 150 phr of said nanocomposite, (B) from zero to about 95 phr of at least one additional diene-based elastomer, so long as the total of the elastomer contained in said rubber composition derived from said nanocomposite and said additional diene-based elastomer is 100 parts by weight, (C) from zero to about 100 phr of at least one additional reinforcing particulate filler selected from carbon black, precipitated silica aggregates, silica-containing carbon black which contains domains of silica on its surface, and mixtures thereof, and, optionally (D) a coupling agent which contains a moiety reactive with hydroxyl groups contained on the peripheral edges of the surface of the platelets of said exfoliated platelets and reactive with hydroxyl groups contained on the surface of said precipitated silica aggregates and said silica-containing carbon black, if said silica and/or silica-containing carbon black is used, and another moiety which is interactive with said diene-based elastomer(s) of the elastomer(s) of said nanocomposite and at least one of said additional elastomers.

12. An article of manufacture having at least one component of a rubber composition containing the nanocomposite of claim 11.

13. A tire having at least one component of a rubber composition which contains the nanocomposite of claim 11.

14. The process of claim 1 wherein said addition of said amine having at least two amine centers simultaneously:

(A) intercalates said at least exfoliates said clay particles, and (B) destabilizes the elastomer latex.

15. The process of claim 1 which further comprises preparing a tire having at least one component of a rubber composition which contains said nanocomposite.

\* \* \* \* \*